(12) United States Patent
    Chen

(10) Patent No.: US 10,783,490 B2
(45) Date of Patent: Sep. 22, 2020

(54) INTELLIGENT WAREHOUSING MANAGEMENT METHOD, APPARATUS, SYSTEM AND UNMANNED INTELLIGENT WAREHOUSING DEVICE

(71) Applicant: ZKH Industrial Supply Co., Ltd., Shanghai (CN)

(72) Inventor: Long Chen, Shanghai (CN)

(73) Assignee: ZKH INDUSTRIAL SUPPLY CO., LTD., Shanghai (CN)

( * ) Notice: Subject to any disclaimer, the term of this patent is extended or adjusted under 35 U.S.C. 154(b) by 262 days.

(21) Appl. No.: 16/103,274

(22) Filed: Aug. 14, 2018

(65) Prior Publication Data
    US 2019/0050794 A1    Feb. 14, 2019

(30) Foreign Application Priority Data
    Aug. 14, 2017   (CN) .......................... 2017 1 0691360

(51) Int. Cl.
    *G06Q 10/08*    (2012.01)
    *G05D 1/00*    (2006.01)
    (Continued)

(52) U.S. Cl.
    CPC ......... *G06Q 10/087* (2013.01); *G05D 1/0088* (2013.01); *G06N 5/046* (2013.01); *G06N 7/00* (2013.01); *G05D 2201/0216* (2013.01)

(58) Field of Classification Search
    CPC ................. G06Q 10/087; G06Q 10/04; G06Q 10/06313; G06Q 10/0637;
    (Continued)

(56) References Cited

U.S. PATENT DOCUMENTS

| 4,827,423 A | * | 5/1989 | Beasley | ............. G01N 29/2493 |
| | | | | 700/96 |
| 4,926,544 A | * | 5/1990 | Koyanagi | ................ B25J 5/007 |
| | | | | 29/703 |

(Continued)

FOREIGN PATENT DOCUMENTS

| CN | 202179140 US | 9/2013 |
| EP | 1382273 A1 | 1/2004 |
| WO | 2015132385 A1 | 9/2015 |

OTHER PUBLICATIONS

H. Li and Y. Tao, "Research on the Procurement Platform for MRO Materials Based on E-Commerce," 2011 International Conference on Management and Service Science, Wuhan, 2011, pp. 1-5, doi: 10.1109/ICMSS.2011.5998981. (Year: 2011).*

(Continued)

*Primary Examiner* — Ashford S Hayles
(74) *Attorney, Agent, or Firm* — Neal, Gerber & Eisenberg LLP

(57) ABSTRACT

This invention has disclosed an intelligent warehousing management method, apparatus, system, an unmanned intelligent warehousing device management method and an unmanned intelligent warehousing device. Wherein the intelligent warehousing management method manages the materials required by products production based on an unmanned intelligent warehousing device with function of connecting to Internet of Things and comprises: an obtaining step, to obtain production plan data of the products and safety factor of the materials; a prediction step, to predict the usage of the materials based on the production plan data and the safety factor; a sending step, to send production data based on the production plan data and the predicted usage to the unmanned intelligent warehousing device; an updating step, to update the production data in real time based on usage of the materials stored in the unmanned intelligent (Continued)

warehousing device; an adjusting step, to adjust usage of the materials utilizing the unmanned intelligent warehousing device based on the updated production data; a calculating step, to calculate the materials needed to be replenished in the unmanned intelligent warehousing device based on the updated production data.

14 Claims, 10 Drawing Sheets

(51) Int. Cl.
  *G06N 5/04* (2006.01)
  *G06N 7/00* (2006.01)
(58) Field of Classification Search
  CPC ........ G06Q 10/06393; G06Q 10/0875; G05D 1/0088; G05D 2201/0216; G06N 5/046; G06N 7/00
  See application file for complete search history.

(56) References Cited

U.S. PATENT DOCUMENTS

| | | | | |
|---|---|---|---|---|
| 5,125,149 A * | 6/1992 | Inaba | ................... | B23P 19/001 198/341.05 |
| 5,216,612 A * | 6/1993 | Cornett | .............. | G05B 19/4184 700/96 |
| 5,402,349 A * | 3/1995 | Fujita | .............. | G05B 19/41865 700/100 |
| 5,734,574 A * | 3/1998 | Yamashita | ........... | B65G 1/1371 414/268 |
| 5,930,763 A * | 7/1999 | Kaneko | ............ | G06Q 10/06315 705/7.25 |
| 6,311,094 B1 * | 10/2001 | Iriuchijima | .......... | G06Q 10/087 700/100 |
| 6,705,523 B1 * | 3/2004 | Stamm | .............. | G05B 19/41895 235/383 |
| 6,813,540 B2 * | 11/2004 | Scotti | .................. | G06Q 10/087 700/216 |
| 7,099,726 B2 * | 8/2006 | Kawase | ............... | G06Q 10/087 700/100 |
| 7,552,066 B1 * | 6/2009 | Landvater | ........ | G06Q 10/06315 705/7.25 |
| 7,580,773 B2 * | 8/2009 | Hariki | ................ | B65G 47/1457 361/71 |
| 7,620,561 B1 * | 11/2009 | Adgaonkar | ............ | G06Q 10/06 705/7.12 |
| 7,987,107 B2 * | 7/2011 | Wilson | ............... | G06Q 10/0631 705/7.12 |
| 8,311,905 B1 * | 11/2012 | Campbell | ............... | G06Q 10/08 705/28 |
| 8,311,906 B1 * | 11/2012 | Campbell | ............... | G06Q 10/06 705/28 |
| 8,620,707 B1 * | 12/2013 | Belyi | ................. | G06Q 10/087 705/28 |
| 8,869,370 B2 * | 10/2014 | Kilibarda | ............... | B23P 19/001 29/430 |
| 9,519,284 B2 * | 12/2016 | Wurman | ............ | G05B 19/4189 |
| 9,663,292 B1 * | 5/2017 | Brazeau | ................ | G06Q 10/04 |
| 10,108,186 B2 * | 10/2018 | Klumpp | ................ | B23P 21/004 |
| 10,120,390 B2 * | 11/2018 | Gariepy | ............... | G05D 1/0297 |
| 10,308,430 B1 * | 6/2019 | Brady | ................ | B65G 1/1373 |
| 2002/0072988 A1 * | 6/2002 | Aram | ................. | G06Q 10/087 705/26.1 |
| 2002/0165804 A1 * | 11/2002 | Beebe | ................. | G06Q 20/203 705/28 |
| 2003/0149638 A1 * | 8/2003 | Itou | ..................... | G06Q 10/087 705/26.1 |
| 2003/0208302 A1 * | 11/2003 | Lemelson | .............. | G05B 19/19 700/245 |
| 2003/0233264 A1 * | 12/2003 | Jones | ............... | G06Q 10/06315 705/7.25 |
| 2004/0073472 A1 * | 4/2004 | Sakuma | ................ | G06Q 10/06 705/7.22 |
| 2004/0093101 A1 * | 5/2004 | Torii | ...................... | G06Q 10/06 700/95 |
| 2004/0093116 A1 * | 5/2004 | Mountz | ................ | G05D 1/0278 700/216 |
| 2004/0103047 A1 * | 5/2004 | Park | ...................... | G06Q 10/087 705/28 |
| 2005/0091070 A1 * | 4/2005 | Adgaonkar | ........ | G06Q 10/0631 705/305 |
| 2005/0234580 A1 * | 10/2005 | Roldan | ............... | G06Q 10/087 700/106 |
| 2006/0004624 A1 * | 1/2006 | Melara | ............... | G06Q 30/0201 705/7.25 |
| 2006/0026072 A1 * | 2/2006 | Suguro | .............. | G06Q 30/0633 705/300 |
| 2006/0229756 A1 * | 10/2006 | Aiso | ..................... | G06Q 10/06 700/99 |
| 2007/0124009 A1 * | 5/2007 | Bradley | ................. | G06Q 10/06 700/99 |
| 2007/0270990 A1 * | 11/2007 | Katircioglu | ............ | G06Q 10/06 700/99 |
| 2009/0157590 A1 * | 6/2009 | Mijares | .................. | E21B 43/00 706/61 |
| 2009/0210081 A1 * | 8/2009 | Sustaeta | ................. | H04L 67/125 700/99 |
| 2009/0292381 A1 * | 11/2009 | Inoue | ................. | G06Q 10/0637 700/101 |
| 2009/0327011 A1 * | 12/2009 | Petroff | ................. | G01C 21/343 705/5 |
| 2011/0213636 A1 * | 9/2011 | Sakuma | ................ | G06Q 50/30 705/7.25 |
| 2012/0065762 A1 * | 3/2012 | Pillarisetti | .............. | G06Q 10/08 700/108 |
| 2012/0323633 A1 * | 12/2012 | Chowdhary | ......... | G06Q 10/047 705/7.31 |
| 2013/0018696 A1 * | 1/2013 | Meldrum | ............... | G06Q 10/06 705/7.27 |
| 2013/0103456 A1 * | 4/2013 | Bannister | ............... | G06Q 10/06 705/7.31 |
| 2013/0184849 A1 * | 7/2013 | Chan | ................ | G05B 19/41815 700/113 |
| 2013/0325159 A1 * | 12/2013 | Kilibarda | ............... | G05B 15/02 700/114 |
| 2014/0031965 A1 * | 1/2014 | Sun | ......................... | G06F 17/00 700/100 |
| 2014/0179231 A1 | 6/2014 | Charania et al. | | |
| 2014/0303768 A1 * | 10/2014 | Klumpp | .................. | B23P 21/00 700/113 |
| 2014/0324491 A1 * | 10/2014 | Banks | .................. | G06Q 10/087 705/7.12 |
| 2014/0365258 A1 * | 12/2014 | Vestal | ............ | G06Q 10/063114 705/7.15 |
| 2015/0254589 A1 * | 9/2015 | Saxena | ................ | G06Q 10/087 705/7.25 |
| 2015/0294252 A1 * | 10/2015 | Van Der Haak | .......................... | G06Q 10/06315 705/7.25 |
| 2016/0171411 A1 * | 6/2016 | Chong | ............... | G06Q 10/0637 705/7.25 |
| 2016/0266578 A1 * | 9/2016 | Douglas | ................ | G05D 1/0225 |
| 2016/0283895 A1 * | 9/2016 | Umeda | ................ | G06Q 10/083 |
| 2017/0199518 A1 * | 7/2017 | Stoeckel | .......... | G05B 19/41865 |
| 2017/0277179 A1 * | 9/2017 | Bhageria | ................ | G05D 1/104 |
| 2017/0300853 A1 * | 10/2017 | Hyodo | ................ | G06Q 10/087 |
| 2017/0315918 A1 * | 11/2017 | Nikitaki | ................ | H04L 67/2842 |
| 2017/0323250 A1 * | 11/2017 | Lindbo | ............... | G06Q 30/0621 |
| 2017/0330138 A1 * | 11/2017 | Stoeckel | .......... | G06Q 10/06315 |
| 2017/0364073 A1 * | 12/2017 | Guy | ..................... | G05D 1/0293 |
| 2018/0005173 A1 * | 1/2018 | Elazary | ................ | G06Q 30/06 |
| 2018/0012166 A1 * | 1/2018 | Devadas | ................ | G06Q 10/06315 |
| 2018/0089612 A1 * | 3/2018 | Kalra | ................... | G06Q 10/087 |
| 2018/0250781 A1 * | 9/2018 | Gauli | ..................... | B23Q 41/02 |
| 2019/0049975 A1 * | 2/2019 | Kattepur | ............ | G05B 19/41895 |
| 2019/0072931 A1 * | 3/2019 | Bank | ..................... | B62D 57/032 |
| 2019/0095834 A1 * | 3/2019 | Nakazono | ........ | G06Q 10/06312 |

(56) References Cited

U.S. PATENT DOCUMENTS

| | | | |
|---|---|---|---|
| 2019/0168394 A1* | 6/2019 | Bidram | B25J 15/0206 |
| 2019/0206007 A1* | 7/2019 | Leach | G06Q 50/28 |
| 2019/0347606 A1* | 11/2019 | Malecha | G06Q 10/087 |
| 2020/0034780 A1* | 1/2020 | Sikka | G06Q 10/087 |

OTHER PUBLICATIONS

B. Y. Qi, Q. L. Yang and Y. Y. Zhou, "Application of AGV in intelligent logistics system," Fifth Asia International Symposium on Mechatronics (AISM 2015), Guilin, 2015, pp. 1-5, doi: 10.1049/cp.2015.1527. (Year: 2015).*

F. Yao, A. Keller, M. Ahmad, B. Ahmad, R. Harrison and A. W. Colombo, "Optimizing the Scheduling of Autonomous Guided Vehicle in a Manufacturing Process," 2018 IEEE 16th International Conference on Industrial Informatics (INDIN), Porto, 2018, pp. 264-269, doi: 10.1109/INDIN.2018.8471979. (Year: 2018).*

\* cited by examiner

INTELLIGENT WAREHOUSING MANAGEMENT METHOD, APPARATUS, SYSTEM AND UNMANNED INTELLIGENT WAREHOUSING DEVICE

CROSS-REFERENCE TO RELATED APPLICATION

This application claims priority to Chinese Patent Application No. 201710691360.4, filed on Aug. 14, 2017, the contents of which are fully incorporated herein by reference.

TECHNICAL FIELD

This invention relates to a MRO system utilizing Internet Plus technology, and specifically relates to an intelligent warehousing management method, apparatus, system, an unmanned intelligent warehousing device management method and an unmanned intelligent warehousing device.

BACKGROUND ART

MRO (Maintenance, Repair & Operations) means that a factory or enterprise maintains and repairs its production or working facilities and equipment to ensure non-production materials required by its operation, the materials may be spare parts used for maintaining and repairing the equipment, or may be relative devices and consumables that ensure the running of its business.

For many problems presently existed in MRO procurement and management process in the enterprises, such as, widely dispersed procurement, high risk of purchasing error, purchasing staff that lack of specialized knowledge, on various quality of spare parts, not paying attention to data mining and analysis, and lacks of effective supplier management mechanism. Existing technology provides MRO supply chain solution. However, the present MRO supply chain solution only digitizes present supply chain management, but not effectively applies Internet of Things and Internet Plus technologies to MRO field.

Existing technology has obvious defects. Specifically, present MRO management system only aims at the interior management of enterprise, but is unable to effectively interface with external supplier service system and is unable to effectively control inventory and supply service. Meanwhile, the suppliers are also unable to analyze the factory's predicted usage consumption through accurate predicting and are unable to stock up and sell spare parts required by the factory. Secondly, workers are informed in advance to get MRO materials at the warehouse, which not only causes huge amount of manpower, material resources and places, but also causes much more waste of management cost. Furthermore, the management of the present MRO management system can only reach production lines, which makes it impossible to perform detailed grading accounting. The system is impossible to account MRO cost and efficiency in accordance with each person; and the supervision of the system is relatively general which makes it impossible to provide accurate data. As a result, data analysis results from analyzing massive data with mathematical models cannot be used by administrator, so the administrator cannot update and improve the production technology through such data analysis results. In general, present MRO system has relatively low efficiency.

SUMMARY OF THE INVENTION

In order to solve above problem and defects of existing technology, the embodiments of this invention provide an intelligent warehousing management method, apparatus, system, a management method for an unmanned intelligent warehousing device and an unmanned intelligent warehousing device so as to combine orders, processes, production lines, people and materials in a MRO system, to solve problems such as, accurate predicting, obtaining as needed, grading accounting, post-supervision, data analysis and technological updating, etc., while improving the management level of factory and achieving the goal of reducing cost comprehensively. In the meantime, suppliers can also prepare reasonable quantities of products predicted usage with high-quality based on actual need of the factory, enhance users' satisfaction and improve overall sales opportunities and sales amount.

In a first aspect, this invention provides an intelligent warehousing management method to manage the materials required by products production based on an unmanned intelligent warehousing device having connection function of Internet of Things. The method comprises: an obtaining step, to obtain production plan data of the products and safety factor of the materials; a predicting step, to predict the predicted usage of the materials based on the production plan data and the safety factor; a sending step, to send production data based on the production plan data and the predicted usage to the unmanned intelligent warehousing device; an updating step, to update the production data in real time based on usage of the materials stored in the unmanned intelligent warehousing device; an adjusting step, to adjust use of the materials utilizing the unmanned intelligent warehousing device based on the updated production data; and a calculating step, to calculate the quantity of the materials needed to be replenished in the unmanned intelligent warehousing device based on the updated production data.

Optionally, the production plan data comprises production cycle, a number of personnel, allowance cycle of the materials, and allowance of the materials of the personnel.

Optionally, the predicted usage can be obtained based on the following formula:

$$Ap = Np \times Pq \times (Pc \div Qp) \times sf$$

Wherein, Ap is the predicted usage, Np is the number of personnel, Pq is the allowance, Pc is the production cycle, Qp is the allowance cycle, and sf is the safety factor.

Optionally, in the calculating step, replenish quantity of the materials can be obtained based on the following formula:

$$FV = (Ap - Ac) \div (Pc - Ad) - Ri$$

or $$FV = (Ap - Ac) \div (Ac + Ad) - Ri$$

Wherein, FV is the replenish quantity, Ap is the predicted usage, Ac is the actual predicted usage of the materials, Pc is the production cycle, Ad is the number of days being produced, and Ri is the remaining inventory of the unmanned intelligent warehousing device.

Optionally, further comprise: an optimizing step, to optimize the production plan data based on the production data after the products production is completed; an accounting step, to check the production cost based on the production plan data and the production data after the products production is completed.

In a second aspect, the embodiments of this invention provide an intelligent warehousing management apparatus to manage the materials required by products production based on an unmanned intelligent warehousing device having connection function of Internet of Things. The apparatus comprises: an obtaining module, for obtaining production plan data of the products and safety factor of the materials; a predicting module, for predicting the predicted usage of the materials based on the production plan data and the safety factor; a sending module, for sending production data based on the production plan data and the predicted usage to the unmanned intelligent warehousing device; an updating module, for updating the production data in real time based on usage of the materials stored in the unmanned intelligent warehousing device; an adjusting module, for adjusting usage of the materials utilizing the unmanned intelligent warehousing device based on the updated production data; and a calculating module, for calculating the quantity of the materials needed to be replenished in the unmanned intelligent warehousing device based on the updated production data.

Optionally, the production plan data comprises production cycle, a number of personnel, allowance cycle of the materials, and allowance of the materials of the personnel.

Optionally, the predicted usage can be obtained based on the following formula:

$$Ap = Np \times Pq \times (Pc \div Qp) \times sf$$

Wherein, Ap is the predicted usage, Np is the number of personnel, Pq is the allowance, Pc is the production cycle, Qp is the allowance cycle, and sf is the safety factor.

Optionally, in the calculating module, replenish quantity of the materials can be obtained based on the following formula:

$$FV = (Ap - Ac) \div (Pc - Ad) - Ri$$

or $$FV = (Ap - Ac) \div (Ac \div Ad) - Ri$$

Wherein, FV is the replenish quantity, Ap is the predicted usage, Ac is the actual predicted usage of the materials, Pc is the production cycle, Ad is the number of days that the products being produced, and Ri is the remaining inventory of the unmanned intelligent warehousing device.

Optionally, further comprise: an optimizing module, for optimizing the production plan data based on the production data after the products production is completed; an accounting module, for accounting the production cost based on the production plan data and the production data after the products production is completed.

In a third aspect, the embodiments of this invention provide an unmanned intelligent warehousing device management method, the unmanned intelligent warehousing device is used for storing materials required by products production which comprise: a receiving step, to receive production data based on the production plan data and predicted usage of the materials; an updating step, to update the production data in real time based on usage of the materials stored in the unmanned intelligent warehousing device; an adjusting step, to adjust usage of the materials based on the updated production data; and an obtaining step, to obtain the data of the replenished materials.

In a fourth aspect, an unmanned intelligent warehousing device is used for storing materials required by products production, and it comprises a memory which stores instructions to be executed by computers; a network interface; a processor which is configured to execute the instructions to perform the management process of the unmanned intelligent warehousing device, the process comprises: a receiving step, to receive production data based on the production plan data and the predicted usage through the network interface; an updating step, to update the production data in real time based on usage of the materials stored in the unmanned intelligent warehousing device; an adjusting step, to adjust usage of the materials based on the updated production data; and an obtaining step, to obtain the quantity of the replenished materials.

In a fifth aspect, the embodiments of this invention provide an intelligent warehousing management system, comprising: the intelligent warehousing management apparatus as described in above second aspect; and the unmanned intelligent warehousing device as described in above fourth aspect.

In a sixth aspect, the embodiments of this invention provide a MRO system, comprising: the intelligent warehousing management system as described in above fifth aspect, a user portal platform, a MRO purchasing platform and a user service platform.

Based on above solutions, the technical solutions of the invention, through mathematical model, predict the materials required by each order, provide decision support for enterprise orders and production scheduling and at the same time provide basis for the suppliers to arrange materials and improve quality of the materials according to the enterprise orders. And, the technical solutions of the invention can achieve organic combination of the manufacturers, materials, production lines, personnel and productive tasks; the workers (users) do not have to think of using which kind of material or the use level, just think of the quality and the product, and they only need to take allowed amount of material on the device directly when needed, thus reducing business inventory and enterprise management cost. For material supply, the manufacturers only need to care for the change of use level of materials, dynamically manage the inventory of materials and comprehensively improve the supply chain's efficiency on the user side. Otherwise, the technical solutions of the invention are able to accurately manage the technology, production lines, personnel and materials, timely improve the level of production and management and comprehensively reduce enterprise cost. In addition, the technical solutions of the invention are able to analyze mass data from multi-dimension and find the defects and problems of the technology, production lines, personnel and materials in enterprise production and supply chain from above mass data to provide reliable foundation for the next production cycle and supplier management, eventually improving supply chain efficiency.

DESCRIPTION OF THE PREFERRED EMBODIMENTS

In order to make the aims and technical solutions of the embodiments of the invention more clear, the technical solutions of the embodiments of the invention would be described below clearly and perfectly with combination of accompanying diagrams of the embodiments of the invention. Apparently, the described embodiments are only a part of embodiments of the invention, not all embodiments of the invention. Based on the embodiments to be described in the invention, all other embodiments that a person skilled in the art can obtain without departing from the scope of the invention are within the scope of the invention.

Figure 1:
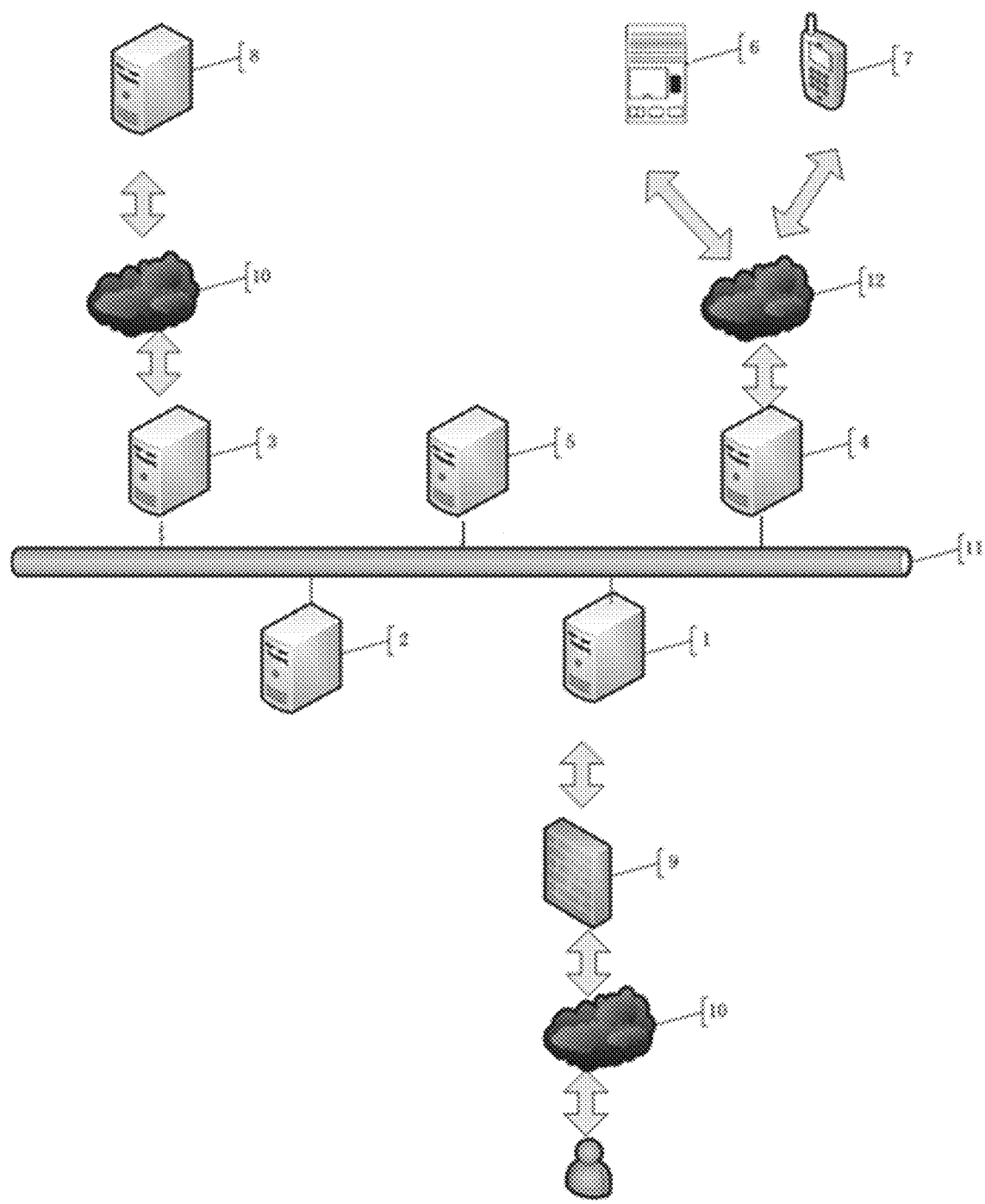
FIG. 1 is a schematic diagram of the hardware structure of MRO system in accordance with the invention.

The hardware structure of MRO system in accordance with the invention would be described in detail with combination of FIG. 1.

FIG. 1 is a schematic diagram of the hardware structure of MRO system in accordance with the invention. As shown in FIG. 1, overall hardware of the system is comprised of unified portal server cluster 1, MRO one-stop procurement platform server cluster 2, enterprise service platform server cluster 3, intelligent warehousing management system server cluster 4, data center server cluster 5, unmanned intelligent warehousing device 6 and smartphone 7, etc. The network is comprised of internet 10, local area private network 11 and 3G/4G network 12. The user or administrative staff of the system accesses the unified portal server cluster 1 through the firewall 9 and the internet 10 to obtain corresponding services from the MRO one-stop procurement platform server cluster 2, the enterprise service platform server cluster 3 and the intelligent warehousing management system server cluster 4. The intelligent warehousing management system server cluster 4 sends data to the unmanned intelligent warehousing device 6 and the smartphone 7 for use through wireless communication network 12. The unmanned intelligent warehousing device 6 and smartphone 7 submit data that materials are replenished and taken by users to the intelligent warehousing management system server cluster 4 through wireless communication network 12. The local area private network 11 is used for communication and data interaction among the unified portal server cluster 1, the MRO one-stop procurement platform server cluster 2, the enterprise service platform server cluster 3, the intelligent warehousing management system server cluster 4 and the data center server cluster 5. The enterprise service platform server cluster 3 performs perform communication and data interaction with factory server 8 through the internet 10.

According to the embodiments of the invention, wireless communication network includes, but not limited to, general packet radio service (GPRS), LTE, HSPA, HSPA+ and other 3G and 4G radio networks used for providing cellular access to the network, and includes 802.11 and 802.11b (WiFi) protocol and Bluetooth protocol used for providing wireless connection to the network.

The intelligent warehousing management method 200 in accordance with an embodiment of the invention would be described in detail with combination of FIG. 2.

FIG. 2 is a flow chart of the intelligent warehousing management method 200 in accordance with an embodiment of the invention.

As shown in FIG. 2, at step S201, production plan data of a product is obtained.

According to the embodiments of the invention, before the starting of production cycle of the product, a plurality of data in the enterprise's plan for the production process of the product, such as a number of days of the production cycle, a number of personnel involved in the production, allowance of the materials each worker can use, allowance cycle of the materials being used, that is, he time period for re-taking such allowance of the materials may be hour, day, week or month, and product related process data and related material data are imported by the intelligent warehousing management apparatus. As an example, the process data can include data, such as process code, process name, process content, process standard, associated production lines and related material. The material data can further include material specification, packaging specification, life span of the materials, quality standard of the materials and ordering cycle of the materials. In addition, according to the planning of production process of the product and properties of the product, a safety factor of the materials is obtained by the intelligent warehousing management apparatus which can be a numerical value of maximum duration that the materials can be out of stock without affecting the production.

Next, at step S202, the predicted usage of the materials is predicted based on the production plan data and the safety factor of the materials.

As mentioned above, when the intelligent warehousing management apparatus needs to perform dynamic prediction, it extracts data of personnel participating in the production from the production plan data, and queries the allowance data and allowance cycle data (the number of days) of each person within this production cycle based on the data of personnel participating in the production, and further extracts the number of the cycle days in the production cycle and the safety factor of the materials. These data are provided to dynamic prediction data model for calculation, and dynamic prediction results are obtained.

Specifically, the formula of the prediction model is:

$$Ap = Np \times Pq \times (Pc \div Qp) \times sf \qquad (1)$$

Wherein, Ap is the predicted usage, Np is the number of personnel, Pq is the allowance of the materials each worker can use, Pc is the production cycle, Qp is the allowance cycle, and sf is the safety factor.

Next, at step S203, the production data based on the production plan data and predicted usage is sent to the unmanned intelligent warehousing device.

The intelligent warehousing management apparatus sends production data which includes the production plan data, predicted usage and other data related to the production to the unmanned intelligent warehousing device through wireless network. In this way, the unmanned intelligent warehousing device can automatically control the material taking based on the data related to, such as process, allowance and materials, etc. in the production data. And then, the workers do not need to care about the variety and allowance of materials, just taking the materials directly based on production requirements during the production process.

Next, at step S204, the production data is updated in real time according to the usage of materials stored in the unmanned intelligent warehousing device.

According to the embodiments of the invention, when workers take the materials from the unmanned intelligent warehousing device at a factory site, the unmanned intelligent warehousing device may record relevant information of each entry for taking, such as material code, material name, allowance of taking, personnel who took the material and time of taking, etc.; related data of each taking may be updated to the intelligent warehousing management apparatus in real time through wireless communication network and the intelligent warehousing management apparatus may update production data of the products according to these above information.

In other cases, workers could also use the unmanned intelligent warehousing device to send request of taking more related materials as need to the intelligent warehousing management apparatus. When the request is approved, the production data may be updated.

Next, at step S205, the usage of materials may be adjusted utilizing the unmanned intelligent warehousing device based on the updated production data.

As mentioned above, within one production cycle, when a worker takes required materials from the unmanned intelligent warehousing device, the number of taken materials cannot exceed the regulated scope of personnel allowance. In general, the intelligent warehousing management apparatus analyzes and monitors material consumption during production by real time data analysis. The data used for analysis comes from production data, such as real time taking data, allowance data and production plan data. The intelligent warehousing management apparatus adjusts the allowance of taking for each person according to the production data that is updated in real time, and strictly controls the allowance of taking by the unmanned intelligent warehousing device, so as to achieve adjustment of materials usage through controlling materials allowance and taking allowance in one production cycle.

Next, at step S206, the quantity of materials required to be replenished in the unmanned intelligent warehousing device are calculated according to the updated production data.

According to the embodiments of the invention, the intelligent warehousing management apparatus calculates the allowance of materials needed to be replenished through the following intelligent replenishment mathematical model based on the production data that is updated in real time, and generates the replenishment plan of the materials.

The formula of intelligent material replenishment allowance is:

$$FV=(Ap-Ac)+(Pc-Ad)-Ri \quad (2)$$

or $$FV=(Ap-Ac)+(Ac \div Ad)-Ri \quad (3)$$

Wherein, FV is the replenishment allowance, Ap is the predicted usage, Ac is the actual usage of the materials, Pc is the production cycle, Ad is the number of days that products being produced, and Ri is the remaining inventory of the unmanned intelligent warehousing device.

After calculating replenishment allowance of the materials, the intelligent warehousing management apparatus may generate data, such as replenishment time, replenishment allowance of the materials, unmanned intelligent warehousing device code and name in the replenishment plan based on the production data. This replenishment plan may be sent to appropriate suppliers or operators so that they can replenish required materials to the unmanned intelligent warehousing device right away to ensure that workers can take materials promptly and accurately.

In the embodiments of the invention, by adopting the above intelligent warehousing management method, materials required for a single order are predicted, supportive decision for enterprise orders and production scheduling is provided. At the same time, a basis for the suppliers to arrange materials and improve quality of the materials is provided based on the enterprise orders. Further, the technical solutions of the invention can achieve effective combination of the manufacturers, materials, production lines, personnel and production tasks; the workers (users) do not need to care about which kind of material is used or the usage, but only need to care about the quality and the product, and they just need to take the materials from the device directly when needed based on the material allowance they can use, thus reducing business inventory and enterprise management cost. For material suppliers, they only need to care for the change of usage of materials, and dynamically manage the inventory of materials and improve the supply chain's efficiency on the user side.

In one embodiment, further, the intelligent warehousing management method 200 can also comprise step S207 and step S208.

At step S207, after the production is completed, the production plan data is optimized based on the production data.

At the end of the production cycle, the intelligent warehousing management apparatus may compare the original production plan data with the final production plan data. As an example, the management apparatus may compare the difference between the actual usage data and predicted usage of the materials in each process phase and each production line, and optimize and improve the production plan data in which problems may exist with combination of the data as described above. Preferably, while at the steps for optimizing, the intelligent warehousing management apparatus may use overall data of the industry so as to optimize the production plan more effectively.

At step S208, after the production is completed, the production cost is accounted based on the production plan data and the production data.

Before the production cycle begins, the enterprise user can set up cost data in the intelligent warehousing management system, bind the cost data with specified department, team or, production line or personnel, and at the same time establish accounting subject or accounting code. When production plan data is obtained by the intelligent warehousing management apparatus, the system may generate subject budget of this production plan automatically based on the personnel allowance and cost data. When one production cycle is finished, the intelligent warehousing management apparatus may generate financial grading accounting data based on material usage data of the personnel and production lines in the production data, and the cost and subject budget data in the system.

Further, the intelligent warehousing management apparatus can generate enterprise materials purchasing list and the enterprise accounting bill based on detailed information of materials usage data.

Figure 2A:
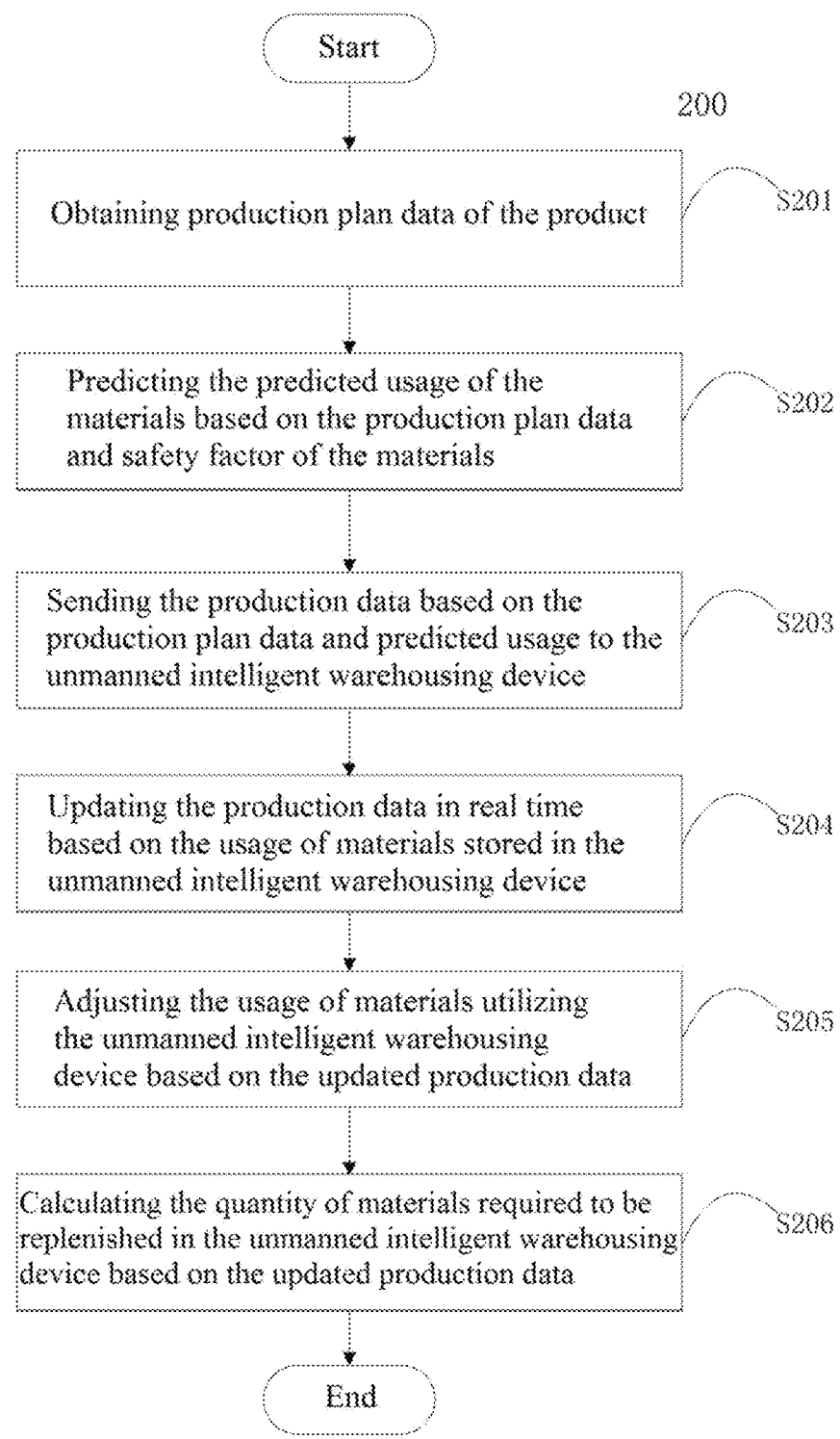
FIGS. 2A-2B are flow charts of the intelligent warehousing management method 200 in accordance with an embodiment of the invention.
Figure 2B:
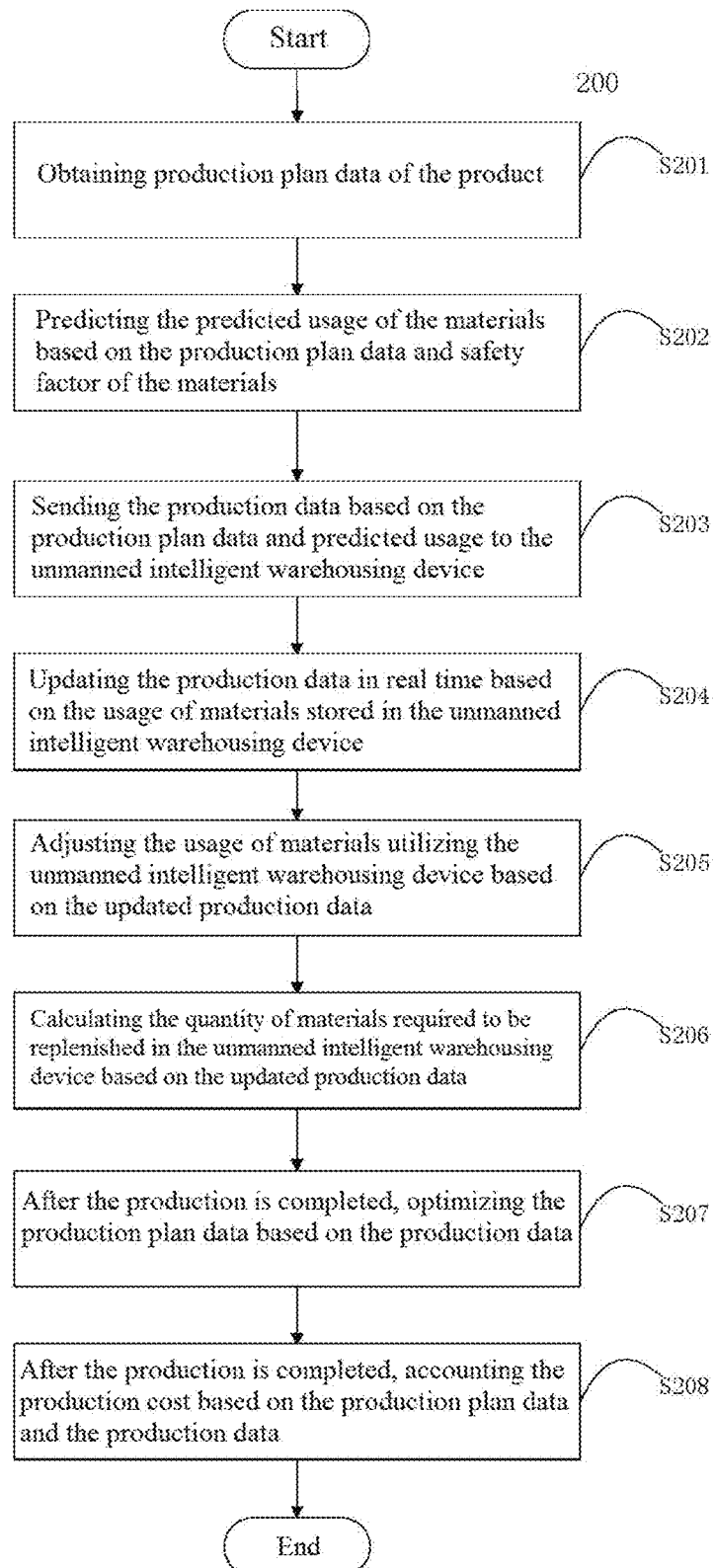

The intelligent warehousing management method 200 in accordance with an embodiment of the invention is described in detail with combination of FIGS. 2A and 2B, and the intelligent warehousing management apparatus in accordance with an embodiment of the invention may be described below with combination of FIGS. 3A and 3B.

Figure 3A:
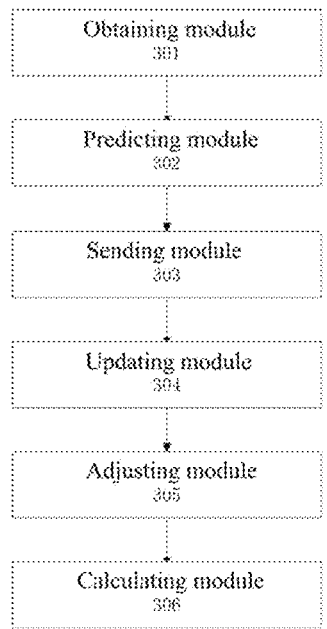
FIGS. 3A-3B are schematic block diagrams of the intelligent warehousing management apparatus 300 in accordance with an embodiment of the invention.

FIG. 3A is a schematic block diagram of the intelligent warehousing management apparatus 300 in accordance with an embodiment of the invention. As shown in FIG. 3, the intelligent warehousing management apparatus 300 comprises:

an obtaining module 301, for obtaining production plan data of the products and a safety factor of the materials;

a prediction module 302, for predicting the usage of the materials based on the production plan data and the safety factor;

a sending module 303, for sending production data based on the production plan data and the predicted usage to the unmanned intelligent warehousing device;

an updating module 304, for updating the production data in real time based on usage of the materials stored in the unmanned intelligent warehousing device;

an adjusting module 305, for adjusting usage of the materials by utilizing the unmanned intelligent warehousing device based on the updated production data; and a calculating module 306, for calculating the allowance of materials needed to be replenished in the unmanned intelligent warehousing device based on the updated production data.

Figure 3B:
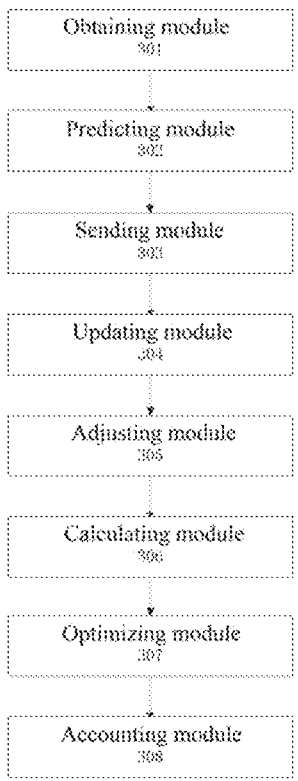

As shown in FIG. 3B, further, the intelligent warehousing management apparatus 300 can also comprise:

an optimizing module 307, for optimizing the production plan data based on the production data after the production is completed; and an accounting module 308, for accounting the production cost based on the production plan data and the production data after the production is completed.

It may be appreciated, the intelligent warehousing management apparatus 300 of the embodiment of the invention may correspond to the intelligent warehousing management apparatus of the embodiment of the invention, and the above-mentioned functions and/or other operations of each module in the intelligent warehousing management apparatus 300 of the embodiment of the invention are for fulfilling corresponding processes of the method in FIG. 2. The detailed description is omitted for simplicity.

The unmanned intelligent warehousing device and its management method in accordance with an embodiment of the invention are described below with combination of FIG. 4 and FIG. 5.

The unmanned intelligent warehousing device is normally deployed at the factory's production line site to provide material storing and taking service for the workers. The device can be achieved based on hardware technology of vending machine with MRO control part. The unmanned intelligent warehousing device can be divided into different types, such as spring-loaded type, grid cabinet type, vertical lane type and drawer type based on different requirements of products produced by factories, production lines and technologies. The device can connect to the intelligent warehousing management apparatus through wireless connection of Internet of Things, so as to achieve data interaction functions of upload, acquisition and download.

Figure 4:
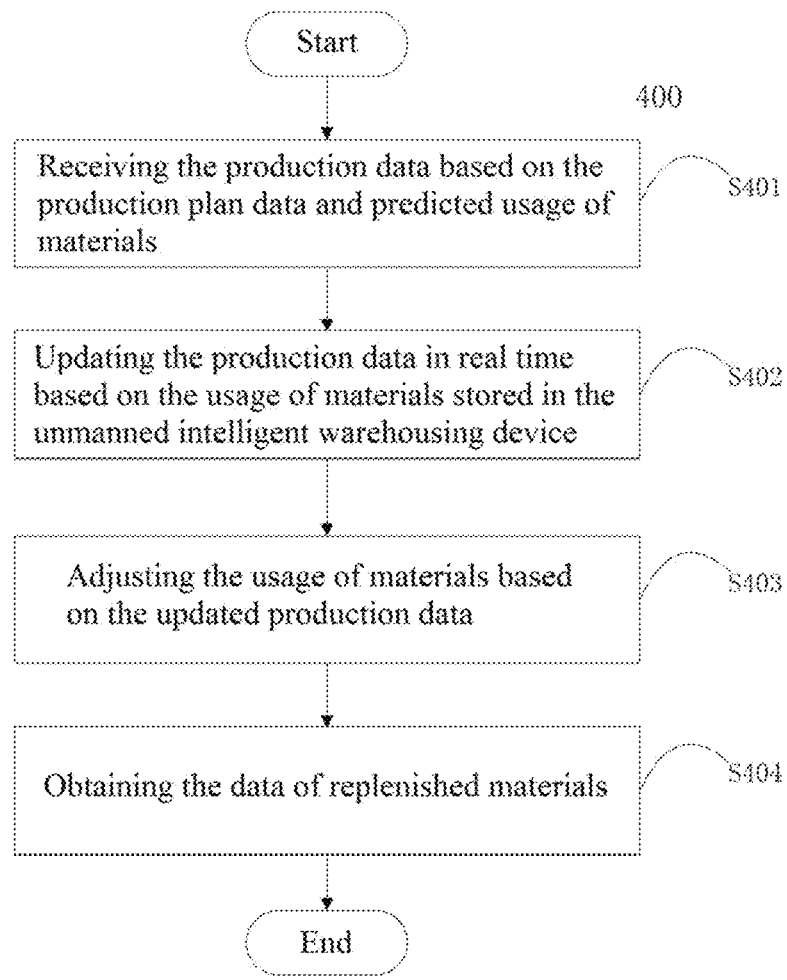
FIG. 4 is a flow chart of an unmanned intelligent warehousing device management method 400 in accordance with an embodiment of the invention.
Figure 5:
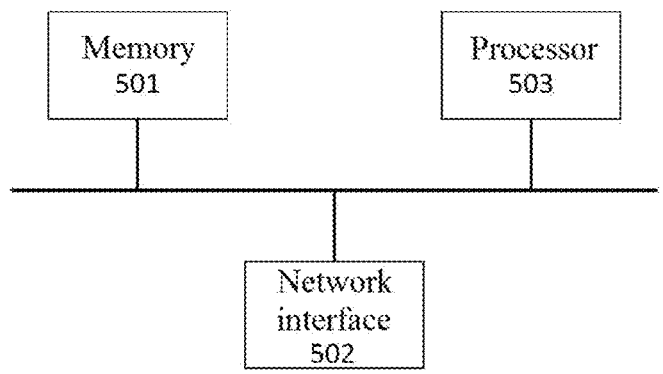
FIG. 5 is a schematic block diagram of the unmanned intelligent warehousing device 500 in accordance with an embodiment of the invention.

FIG. 4 is a flow chart of an unmanned intelligent warehousing device management method 400 in accordance with an embodiment of the invention.

As shown in FIG. 4, at step S401, the production data based on the production plan data and predicted usage of materials is received.

At the beginning of the production cycle, the unmanned intelligent warehousing device receives production data from the intelligent warehousing management apparatus. The unmanned intelligent warehousing device receives production data related to the personnel and materials, such as basic information and permission of workers, permission data of materials' type and allowance each worker is allowed, and materials' inventory data.

At step S402, the production data is updated in real time based on the usage of materials stored in the unmanned intelligent warehousing device.

The usage of materials can be divided into the type of taking, borrowing and returning, and the unmanned intelligent warehousing device may update the materials usage data to the intelligent warehousing management apparatus.

The process of material taking and borrowing and returning of the unmanned intelligent warehousing device (vending machine) is described below with combination of FIG. 6 and FIG. 7.

Figure 6:
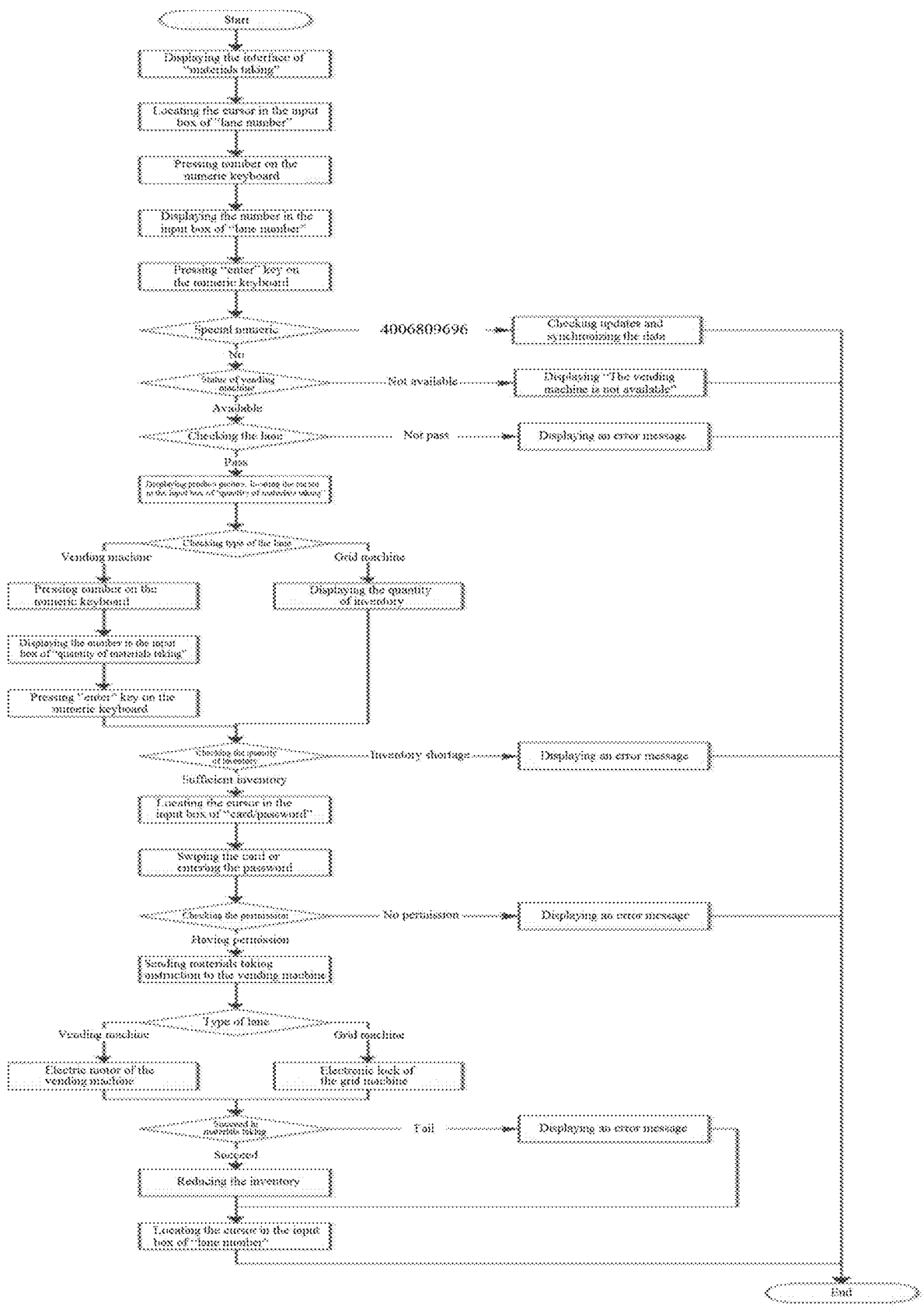
FIG. 6 is a flow chart of materials taking of the unmanned intelligent warehousing device in accordance with an embodiment of the invention.

FIG. 6 is a schematic diagram of material taking from the unmanned intelligent warehousing device. As shown in FIG. 6, when the material taking begins, the cursor is positioned in the input box of "lane number" in the normal material taking interface. After entering the lane number, determining whether the input "lane number," is a special number, if it is not a special number like 4006809696, then continuing to execute the process; otherwise the function of "check updates and synchronize data" is called. Checking "vending machine" table to confirm the status of the vending machine, if it is available, then continuing to execute the process; otherwise ending the operation and displaying the message prompts "The vending machine is not available, please contact the system administrator".

At the next step, checking the lane: a) if the input lane number is contained in the lane number of vending machine lane i.e. "vending machine lane. lane number", then continuing to execute the process; otherwise ending the operation and displaying an error message; b) if condition of the vending machine lane equals to normal, i.e. "vending machine lane. Status=normal", then continuing to execute the process; otherwise ending the operation and displaying an error message; c) if sale type of vending machine lane, i.e. "vending machine lane. sale type" is determined as not be borrowing/returning, then continuing to execute the process; otherwise ending the operation and displaying the message: lane number XXX can only be used for "borrowing/returning", not taking, please re-enter! d) Through "lane number", looking up "vending machine lane" table and obtaining "vending machine ID" and "SKUID".

Next, displaying a picture of the product: through "SKUID", querying "product picture" table, obtaining "product picture" table, querying path of the product picture, and downloading the product picture. Positioning the cursor in the input box of "the number of materials for taking", then entering the number.

Checking "vending machine lane. lane type": a) if the type of the lane belongs to vending machine, pressing the numeric key; b) if the type of the lane belongs to grid machine, querying "lane inventory of vending machine" table through "vending machine ID", "lane number", and obtaining "inventory number", directly displaying "inventory of vending machine lane. inventory quantity".

Then, checking the inventory quantity: if "the quantity of materials for taking" is not zero and "the quantity of materials for taking" is less than or equals to the inventory number, then continuing to execute the process; otherwise ending the operation and displaying an error message.

Next, the cursor is positioned in the input box of "card/password". After swiping card or entering password, checking card/password permission: a) through "serial number of the card" or "password", querying "card/password" table: 1. If the record number is not determined as zero, then continuing to execute the process; otherwise ending the operation and displaying an error message. 2. If determining "type of the card" equals to card number of a customer, then continuing to execute the process; otherwise ending the operation and displaying an error message. 3. If determining "customer status" is available, then continuing to execute the process;

otherwise displaying an error message. 4. Through "card ID", querying "customer and employee card/password permission" table, and if the record number is not zero, obtaining "customer and employee ID" and continuing to execute the process; through "customer and employee ID", querying "customer and employee" table, obtaining "customer ID", determining whether the status of the customer is enable"; through "card ID", "customer ID", and "vending machine ID", querying "vending machine card/password permission" table, and if the record number is not zero, obtaining "ID"; through "vending machine ID" and "SKUID", querying "products of the vending machine" table, obtaining an "product ID of the vending machine"; through "customer ID", "vending machine card/password permission. ID", "product ID of the vending machine", querying "materials taking permission" table, and determining the materials taking permission.

Next, sending materials taking instruction to the vending machine or grid machine, and after succeeding in materials taking, the inventory transaction record is added and the inventory quantity is updated. Finally, returning to the interface, and the cursor is positioned to the input box of "lane number".

Figure 7:
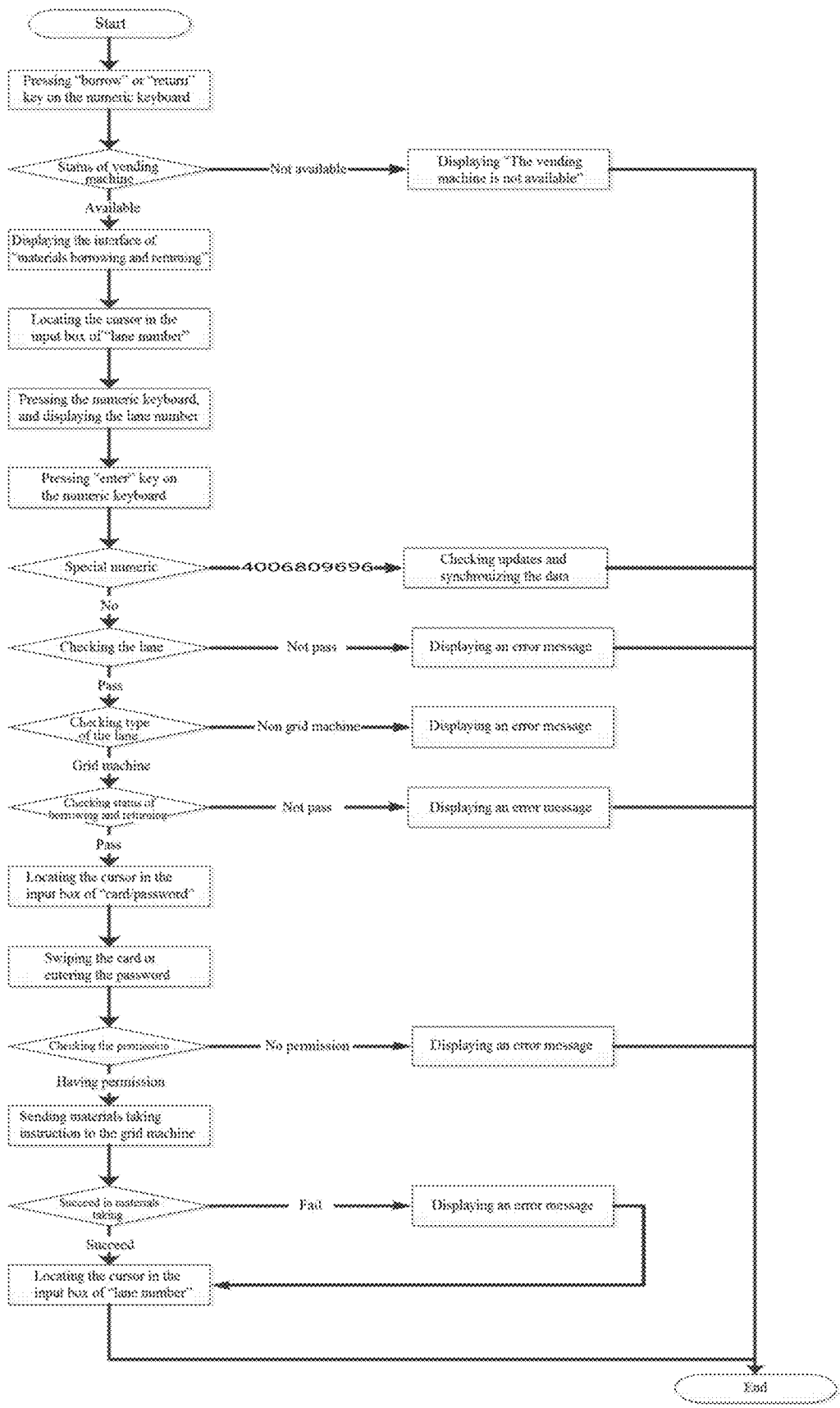
FIG. 7 is a flow chart of materials borrowing and returning of the unmanned intelligent warehousing device in accordance with an embodiment of the invention.

FIG. 7 is a schematic diagram of materials borrowing and returning of the unmanned intelligent warehousing device.

As shown in FIG. 7, first, selecting "borrow" or "return" operation; determining whether the status of vending machine is available. The "materials borrowing and returning" interface is displayed, and the cursor is located at the input box of "lane number". After entering the lane number, the input of "lane number" is determined. Then, checking whether the status of lane is normal; determining whether the type of lane is available for borrowing/returning; checking whether the status of borrowing/returning is normal, querying the latest entry of "inventory transaction record", which receipt type is borrowing/returning; if the record number is zero, when the numeric keypad "borrow" is pressed, displaying an error message, and when the numeric key "return" is pressed, continue to execute the process; if the transaction number is −1, then 1. Based on vending machine ID, lane number, and the receipt type=borrowing/returning, querying creator and creating time of "inventory transaction record"; based on "creator", querying employee's name and phone number of "customer and employee" table; 2. Pressing the numeric keypad "borrow", then ending the operation and displaying an error message; 3. Pressing the numeric keypad "return", continuing to execute the process, and then subsequently determining whether it is returned by original borrower; if the transaction number=1, then 1. when the numeric keypad "borrow" is pressed, continue to execute the process; 2. when the numeric keypad "return" is pressed, then ending the operation and displaying an error message.

Next, as mentioned above, the cursor is located in the input box of "card/password". After swiping card or entering password, checking card/password permission, and then determining whether the current user and the last borrower are the same person.

Next, sending materials taking instruction to the grid machine, add record of inventory transaction, and update the inventory quantity. Finally, returning to the interface, and the cursor is located in the input box of "lane number".

Return to FIG. 4, at step 403, the usage of materials is adjusted based on the updated production data.

The unmanned intelligent warehousing device, based on the updated production data by the intelligent warehousing management apparatus, as mentioned above, while the materials is taking, borrowing and returning, determines each worker's operation permission and material usage permission so as to adjust the usage of materials based on the permission, such as increasing or decreasing the usage of certain material, or changing material type and allowance of different types of work.

At step 404, data of replenished materials is obtained.

After the intelligent warehousing management apparatus calculates the quantity of materials needed to be replenished in the unmanned intelligent warehousing device, the supplier may replenish the unmanned intelligent warehousing device. After finishing the replenishment operation, the unmanned intelligent warehousing device may obtain data of replenished materials and send it to the intelligent warehousing management apparatus, thus the apparatus can update the material data and check whether the data of replenished materials is consistent with the replenishment plan.

Figure 8:
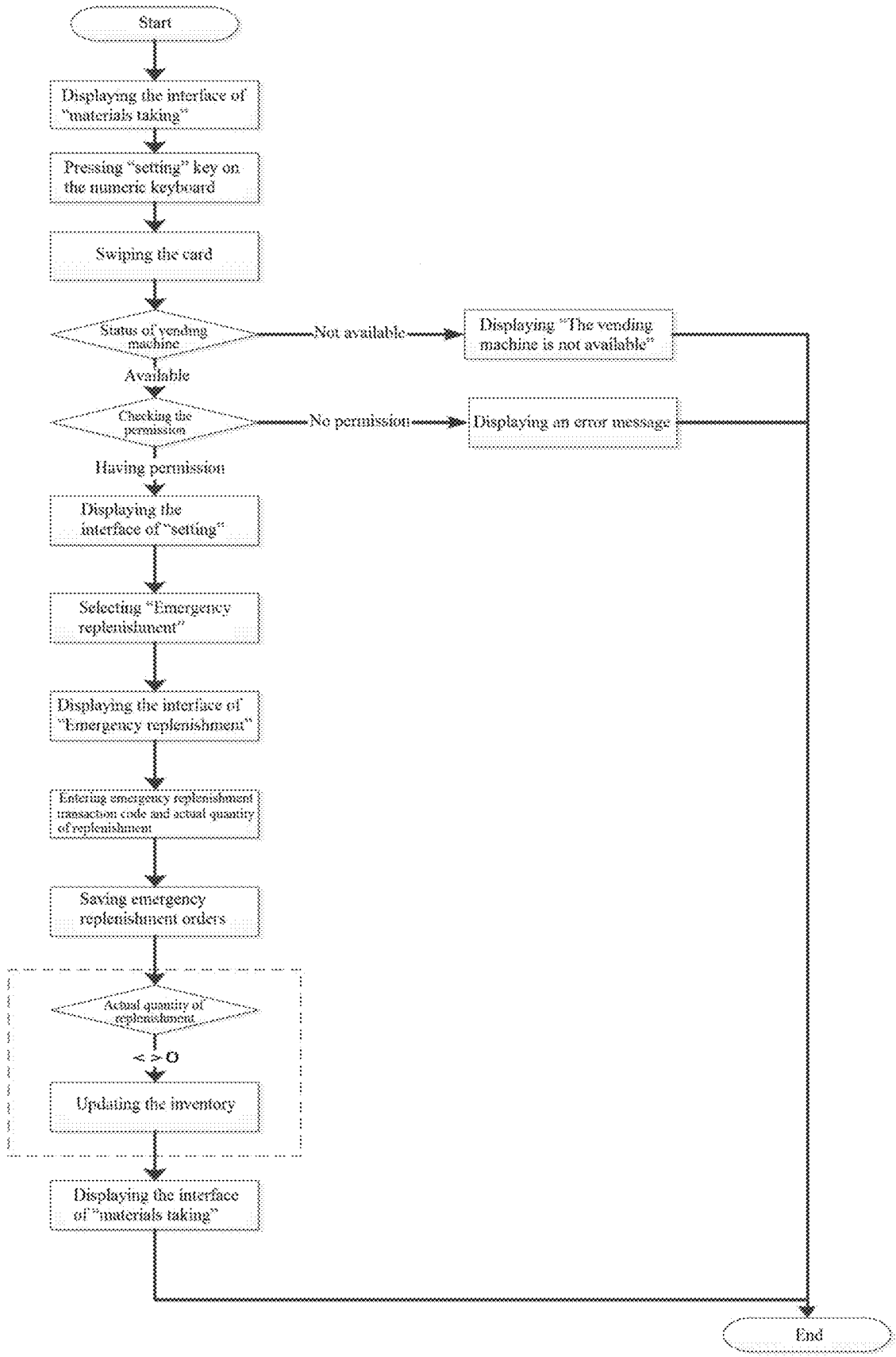
FIG. 8 is a flow chart of materials replenishment of the unmanned intelligent warehousing device in accordance with an embodiment of the invention.

Specifically, replenishment process of the unmanned intelligent warehousing device is described with combination of FIG. 8.

As shown in FIG. 8, pressing the key of "setting" on the numeric keyboard, and the card of replenishment staff is swipe and querying whether the status of vending machine is available; at the next step, the replenishment staff's permission is checked; then "setting interface" is displayed, "emergency replenishment" is selected, and the interface of emergency replenishment is displayed; enter "emergency replenishment transaction code", "actual quantity of replenishment", and click save. Next, check "actual quantity of replenishment", when the actual quantity is not zero, the system may automatically update the inventory; finally, adding record of inventory transaction, the inventory quantity is updated and backing to the main interface.

Further, the unmanned intelligent warehousing device can also obtain data of replenished materials through the operation of inventory checking.

Figure 9:
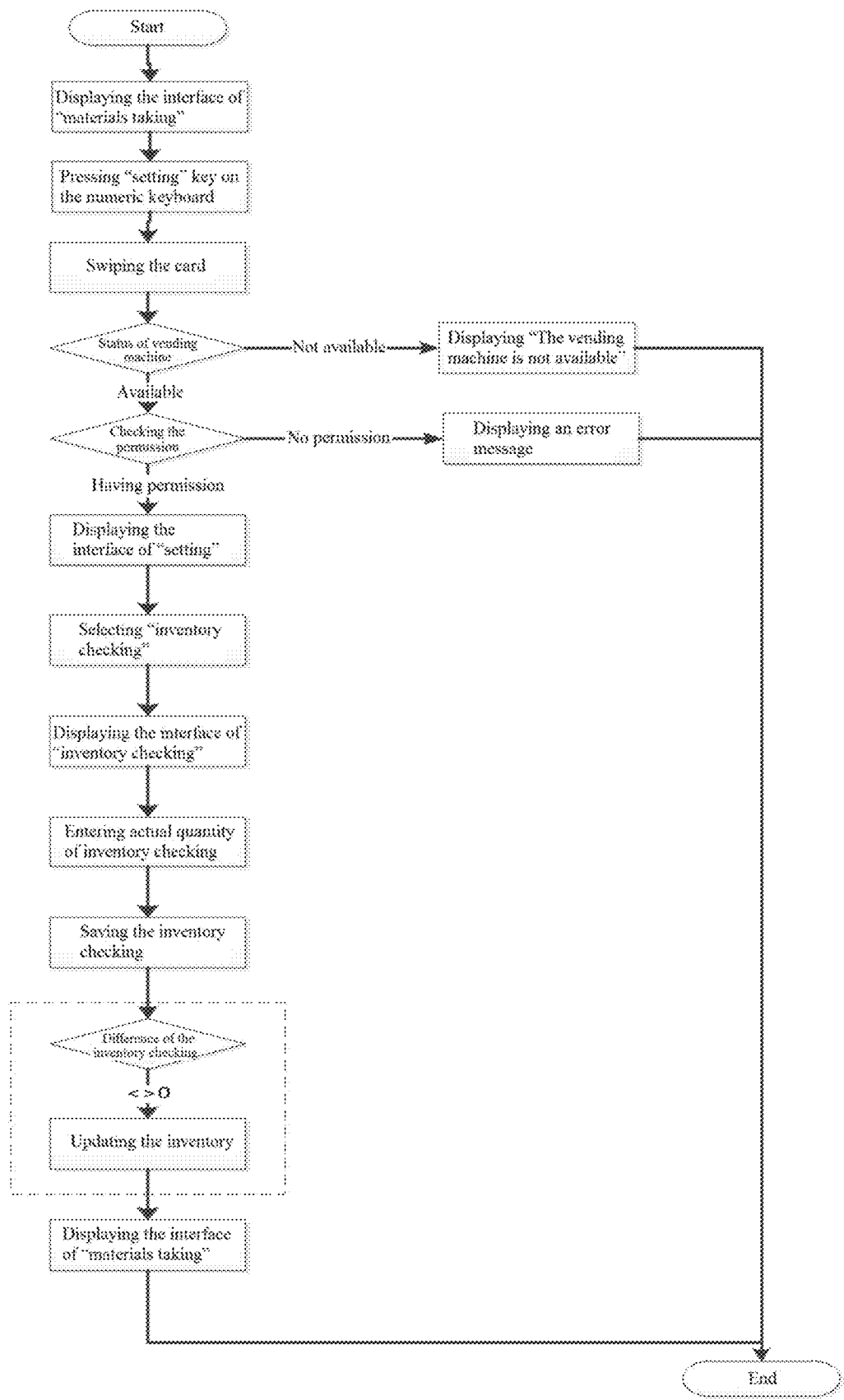
FIG. 9 is a flow chart of materials inventory of the unmanned intelligent warehousing device in accordance with an embodiment of the invention.

As shown in FIG. 9, first, press the key of "setting" on the numeric keyboard, and the card of the replenishment staff is swiped to querying whether the status of vending machine is available; at the next step, checking the replenishment staff's permission; then displaying "setting interface", selecting "inventory checking", and displaying the interface of inventory checking, and querying products of the lane; next, entering "inventory checking transaction code", "actual quantity of inventory checking" and save them. Next add record of inventory checking, circularly checking "difference of inventory checking", when it is not zero, automatically updating the inventory number; and backing to the main interface.

Return to FIG. 5, FIG. 5 is a schematic block diagram of the unmanned intelligent warehousing device 500 in accordance with an embodiment of the invention. As shown in FIG. 5, the unmanned intelligent warehousing device comprises a memory 501 stores instructions which can be executed by computers, a network interface 502, a processor 503 configured to execute instructions to implement process of intelligent warehousing management, said process includes: a receiving step, to receive production data based on the production plan data and predicted usage of the materials through the network interface; an updating step, to update the production data in real time based on usage of the materials stored in the unmanned intelligent warehousing device; an adjusting step, to adjust usage of the materials based on the updated production data; and an obtaining step, to obtain the data of the replenished materials.

Figure 10:
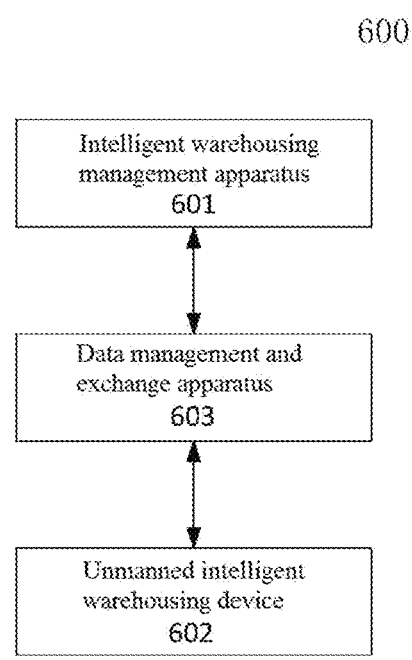
FIG. 10 is a schematic block diagram of the intelligent warehousing management system 600 in accordance with an embodiment of the invention.

FIG. 10 is a schematic block diagram of the intelligent warehousing management system in accordance with an embodiment of the invention. As shown in FIG. 10, this system 600 includes: an intelligent warehousing management apparatus 601, an unmanned intelligent warehousing device 602 and a data management and exchange apparatus 603. Wherein the intelligent warehousing management apparatus 601 can be the intelligent warehousing management apparatus described in FIG. 3A or FIG. 3B. The unmanned intelligent warehousing device 602 can be the unmanned intelligent warehousing device described in FIG. 5.

The data management and exchange apparatus 603 is used for managing basic data of the intelligent warehousing management system, and exchanging the production data. Basic data of the intelligent warehousing management system includes intelligent warehousing management system data, process data, user permission data, customer information data, customer material data, customer price data, inventory checking data, cost data etc. The data management and exchange apparatus 603 uniformly manages the above data. The part of data exchange for the apparatus 603 provides the intelligent warehousing management system with data exchange with other peripheral system, self-existent one-stop purchasing platform and enterprise service platform and data exchange with the intelligent warehousing device management apparatus and the unmanned intelligent warehousing device. Specifically, on the one hand, the data management and exchange apparatus 603 monitors and manages the materials taking data uploaded by the intelligent warehousing device and is an interface service for data uploaded by the intelligent warehousing device and system; on the other hand, it monitors and manages the materials taking data released by the intelligent warehousing management apparatus and is an interface service for data released by the system and the intelligent warehousing management apparatus; in addition, it also provides data exchange between the system and a third party system with an interface service.

Further, based on embodiments of the invention, it also provides a MRO system. As shown in FIG. 1, this system can include an intelligent warehousing management system, a user portal platform, a MRO purchasing platform and a user service platform on a server cluster. Wherein, this intelligent warehousing management system can be the intelligent warehousing management system described in FIG. 10.

To be sure, above methods and embodiments are described as s series of movement combination for sake of simplicity, but a person skilled in the art shall know that, this invention is not limited by the order of described movements for the reason that some steps can adopt other order or be performed simultaneously based on the invention. Then, a person skilled in the art shall also know that, embodiments described in the specification all belong to preferred embodiments and the involved movements and modules may not be necessary for this invention.

Although this text has already disclosed various aspects and embodiments, other aspects and embodiments may be apparent for a person skilled in the art. Various aspects and embodiments disclosed by the text are for illustrative purposes, not limitation, and the actual scope shall be indicated by the appended claims along with the full scope of equivalents to which such claims are entitled. It is to be understood that the terminology used herein is used for the purpose of describing particular embodiments only and is not intended to be limiting of the invention.

The described examples can be amended, changed and varied in detail, however, the intention is to interpret above description and all items illustrated in the accompanying diagrams as illustrative and not in a limiting sense.

The invention claimed is:

1. An intelligent warehousing management method configured to manage materials required by product production based on an unmanned, and optionally internet-connected, intelligent warehousing device, comprising:
    obtaining production plan data of the products and safety factor of the materials;
    predicting the predicted usage of the materials based on the production plan data and the safety factor;
    sending production data based on the production plan data and the predicted usage to the unmanned intelligent warehousing device;
    updating the production data in real time based on usage of the materials stored in the unmanned intelligent warehousing device;
    adjusting usage of the materials utilizing the unmanned intelligent warehousing device based on the updated production data; and
    calculating the quantity of the materials needed to be replenished in the unmanned intelligent warehousing device based on the updated production data.

2. The method according to claim 1, wherein, the production plan data comprises:
    production cycle, a number of personnel, allowance cycle of the materials and allowance of the materials of the personnel.

3. The method according to claim 2, wherein, the predicted usage is based on the following formula:

$$Ap = Np \times Pq \times (Pc \div Qp) \times sf$$

wherein, Ap is the predicted usage, Np is the number of personnel, Pq is the allowance, Pc is the production cycle, Qp is the allowance cycle, and sf is the safety factor.

4. The method according to claim 3, wherein, in the calculating step, the quantity of the materials needed to be replenished is based on the following formula:

$$FV = (Ap - Ac) \div (Ac + Ad) - Ri$$

wherein, FV is the replenish quantity, Ap is the predicted usage, Ac is the actual usage of the materials, Pc is the production cycle, Ad is the number of days that the product is produced, and Ri is the remaining inventory of the unmanned intelligent warehousing device.

5. The method according to claim 4, wherein, further comprising:
    optimizing the production plan data based on the production data after the products production is completed; and accounting the production cost based on the production plan data and the production data after the products production is completed.

6. An intelligent warehousing management apparatus configured to manage managing the materials required by product production based on an unmanned, and optionally internet-connected, intelligent warehousing device, comprising:
   an obtaining module configured to obtain production plan data of the products and safety factor of the materials;
   a predicting module configured to predict the predicted usage of the materials based on the production plan data and the safety factor;
   a sending module configured to send production data based on the production plan data and the predicted usage to the unmanned intelligent warehousing device;
   an updating module configured to update the production data in real time based on usage of the materials stored in the unmanned intelligent warehousing device;
   an adjusting module configured to adjust usage of the materials utilizing the unmanned intelligent warehousing device based on the updated production data; and
   a calculating module configured to calculate the quantity of the materials needed to be replenished in the unmanned intelligent warehousing device based on the updated production data.

7. The apparatus according to claim 6, wherein, the production plan data comprises:
   production cycle, a number of personnel, allowance cycle of the materials and allowance of the materials of the personnel.

8. The apparatus according to claim 7, wherein, the predicted usage is obtained based on the following formula:

$$Ap=Np \times Pq \times (Pc \div Qp) \times sf$$

wherein, Ap is the predicted usage, Np is the number of personnel, Pq is the allowance, Pc is the production cycle, Qp is the allowance cycle, and sf is the safety factor.

9. The apparatus according to claim 8, wherein, in the calculating module, the quantity of the materials needed to be replenished is based on the following formula:

$$FV=(Ap-Ac) \div (Pc-Ad)-Ri$$

or $$FV=(Ap-Ac) \div (Ac \div Ad)-Ri$$

wherein, FV is the replenish quantity, Ap is the predicted usage, Ac is the actual usage of the materials, Pc is the production cycle, Ad is the number of days that the product is produced, and Ri is the remaining inventory of the unmanned intelligent warehousing device.

10. The apparatus according to claim 9, wherein, further comprising:
    an optimizing module, configured to optimize the production plan data based on the production data after the products production is completed;
    an accounting module configured to account the production cost based on the production plan data and the production data after the products production is completed.

11. An unmanned intelligent warehousing device configured to store materials required by product production, comprising a memory configured for storing instructions to be executed by a computer; a network interface;
    a processor configured to execute the instructions to perform a management process comprising:
    receiving production data based on the production plan data and the predicted usage through the network interface;
    updating production data in real time based on usage of the materials stored in the unmanned intelligent warehousing device;
    adjusting usage of the materials based on the updated production data;
    obtaining the quantity of the replenished materials.

12. An intelligent warehousing management system, comprising:
    an intelligent warehousing management apparatus configured to manage managing the materials required by product production based on an unmanned, and optionally internet-connected, intelligent warehousing device, comprising:
    an obtaining module configured to obtain production plan data of the products and safety factor of the materials;
    a predicting module configured to predict the predicted usage of the materials based on the production plan data and the safety factor;
    a sending module configured to send production data based on the production plan data and the predicted usage to the unmanned intelligent warehousing device;
    an updating module configured to update the production data in real time based on usage of the materials stored in the unmanned intelligent warehousing device;
    an adjusting module configured to adjust usage of the materials utilizing the unmanned intelligent warehousing device based on the updated production data; and
    a calculating module configured to calculate the quantity of the materials needed to be replenished in the unmanned intelligent warehousing device based on the updated production data;
    wherein the unmanned, and optionally internet-connected, intelligent warehousing device is configured to store materials required by product production, comprising a memory configured for storing instructions to be executed by a computer, a network interface, and a processor configured to execute the instructions to perform a management process comprising:
    receiving production data based on the production plan data and the predicted usage through the network interface;
    updating production data in real time based on usage of the materials stored in the unmanned intelligent warehousing device;
    adjusting usage of the materials based on the updated production data;
    obtaining the quantity of the replenished materials.

13. A Maintenance, Repair and Operations (MRO) system, comprising:
    the intelligent warehousing management system of claim 12, a user portal platform, a MRO purchasing platform and a user service platform.

14. The method according to claim 3, wherein, in the calculating step, the quantity of the materials needed to be replenished is based on the following formula:

$$FV=(Ap-Ac) \div (Pc-Ad)-Ri$$

wherein FV is the replenish quantity, Ap is the predicted usage, Ac is the actual usage of the materials, Pc is the production cycle, Ad is the number of days that the product is produced.

* * * * *

UNITED STATES PATENT AND TRADEMARK OFFICE
CERTIFICATE OF CORRECTION

PATENT NO. : 10,783,490 B2
APPLICATION NO. : 16/103274
DATED : September 22, 2020
INVENTOR(S) : Long Chen Page 1 of 1

It is certified that error appears in the above-identified patent and that said Letters Patent is hereby corrected as shown below:

In the Claims

Claim 10, Column 15, Line 61, "production is completed;" should be changed to --production is completed; and--.

Claim 11, Column 16, Line 2, "a network interface;" should be changed to --a network interface; and--.

Claim 14, Column 17, Line 4, "product is produced" should be changed to --product is produced, and Ri is the remaining inventory of the unmanned intelligent warehousing device--.

Signed and Sealed this
Second Day of March, 2021

Drew Hirshfeld
*Performing the Functions and Duties of the
Under Secretary of Commerce for Intellectual Property and
Director of the United States Patent and Trademark Office*